(12) United States Patent
Ly et al.

(10) Patent No.: US 9,617,892 B2
(45) Date of Patent: Apr. 11, 2017

(54) METHOD AND APPARATUS TO REDUCE UREA DEPOSITS

(71) Applicant: Caterpillar Inc., Peoria, IL (US)

(72) Inventors: Cuong C. Ly, Peoria, IL (US); Brian C. Applegate, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 7 days.

(21) Appl. No.: 14/806,125

(22) Filed: Jul. 22, 2015

(65) Prior Publication Data

US 2017/0022869 A1   Jan. 26, 2017

(51) Int. Cl.
| | |
|---|---|
| F01N 13/08 | (2010.01) |
| F01N 3/20 | (2006.01) |
| F01N 3/28 | (2006.01) |
| F01N 11/00 | (2006.01) |
| B01F 5/06 | (2006.01) |
| F01N 9/00 | (2006.01) |

(52) U.S. Cl.
CPC ............ *F01N 3/2066* (2013.01); *F01N 3/28* (2013.01); *B01F 2005/0625* (2013.01); *F01N 3/206* (2013.01); *F01N 3/2892* (2013.01); *F01N 9/00* (2013.01); *F01N 11/00* (2013.01); *F01N 2240/20* (2013.01); *F01N 2290/08* (2013.01); *F01N 2610/02* (2013.01); *F01N 2610/1453* (2013.01); *F01N 2900/08* (2013.01); *F01N 2900/1404* (2013.01); *F01N 2900/1406* (2013.01)

(58) Field of Classification Search
CPC ............ B01F 2005/0625; F01N 3/206; F01N 3/2066; F01N 3/2892; F01N 9/00; F01N 11/00; F01N 2240/20; F01N 2290/08; F01N 2610/02; F01N 2610/1453; F01N 2900/08; F01N 2900/1404; F01N 2900/1406
USPC .................................. 60/274, 295, 301, 317
See application file for complete search history.

(56) References Cited

U.S. PATENT DOCUMENTS

| | | | |
|---|---|---|---|
| 8,454,889 B2 | 6/2013 | Janssen et al. | |
| 8,596,046 B2 | 12/2013 | Inoue et al. | |
| 2009/0031714 A1* | 2/2009 | Jochumsen | ........... F01N 3/2066 60/303 |

(Continued)

FOREIGN PATENT DOCUMENTS

| | | |
|---|---|---|
| CN | 102022165 A | 4/2011 |
| CN | 203469703 U | 3/2014 |

(Continued)

*Primary Examiner* — Jorge Leon, Jr.
(74) *Attorney, Agent, or Firm* — Leydig, Voit & Mayer, Ltd.

(57) ABSTRACT

An exhaust after-treatment system for mitigating deposition of urea utilizing selective catalytic reduction (SCR) in exhaust receiving communication with an exhaust gas stream produced by an engine system, including an exhaust passage including a mixing duct through which the exhaust gas stream flows. A fluid reservoir contains a urea solution and a fluid pump is fluidly connected to the fluid reservoir to draw the urea solution from within the fluid reservoir. A fluid injector is configured to receive the urea solution from the fluid pump and deliver the urea solution into the mixing duct and at least one vibration mechanism is mechanically coupled to one or both of the fluid injector and the mixing duct to generate and convey vibrations thereto to mitigate the deposition of urea.

17 Claims, 7 Drawing Sheets

(56) References Cited

U.S. PATENT DOCUMENTS

2014/0360166 A1    12/2014  Chandrasekaran et al.
2016/0017777 A1*   1/2016   Kasai ..................... B01D 53/90
                                                        60/286

FOREIGN PATENT DOCUMENTS

CN          104047681 A       9/2014
DE        102012213388 A1 *   2/2014   .............. B06B 3/00
WO      WO 2013/032390 A1     3/2013

* cited by examiner

METHOD AND APPARATUS TO REDUCE UREA DEPOSITS

TECHNICAL FIELD

This disclosure relates generally to engine systems and, more particularly, to exhaust after-treatment systems and methods.

BACKGROUND

One known method for abating certain diesel engine exhaust constituents is by use of an exhaust after-treatment system that utilizes Selective Catalytic Reduction (SCR) of nitrogen oxides. In a typical SCR system, urea or a urea-based water solution is mixed with exhaust gas. In some applications, a urea solution is injected directly into an exhaust passage through a specialized injector device. The injected urea solution mixes with exhaust gas and breaks down to provide ammonia ($NH_3$) in the exhaust gas stream. The ammonia then reacts with nitrogen oxides ($NO_x$) in the exhaust at a catalyst to provide nitrogen gas ($N_2$) and water ($H_2O$).

As can be appreciated, exhaust after-treatment systems that utilize SCR require the presence of some form of urea close to the engine exhaust after-treatment system such that the urea can be continuously supplied during operation. Various urea or urea-solution delivery systems are known and used in engine applications. In known urea injection systems, a buildup of injected urea can occur when urea becomes deposited on surfaces of the SCR system. The urea buildup, which may involve crystallization of the deposits, can adversely affect flow-through of exhaust gases through the system and reduce the efficiency of the reaction of the urea with the nitrogen oxides. In addition, it has been recognized that buildup and fouling of the injector tip itself will adversely affect the urea solution spray pattern and penetration generated by the injector. Therefore, buildup of urea on various components is of concern.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes an exhaust after-treatment system for mitigating deposition of urea utilizing selective catalytic reduction (SCR) in exhaust receiving communication with an exhaust gas stream produced by an engine system, including an exhaust passage including a mixing duct through which the exhaust gas stream flows. A fluid reservoir contains a urea solution and a fluid pump fluidly is connected to the fluid reservoir to draw the urea solution from within the fluid reservoir. A fluid injector is configured to receive the urea solution from the fluid pump and deliver the urea solution into the mixing duct and at least one vibration mechanism is mechanically coupled to one or both of the fluid injector and the mixing duct to generate and convey vibrations thereto to mitigate the deposition of urea.

In another embodiment, the present disclosure describes a method of mitigating deposition of urea within an exhaust after-treatment system utilizing selective catalytic reduction (SCR) in exhaust receiving communication with an exhaust gas stream produced by an engine system, including the steps of directing the exhaust gas stream through a mixing duct of a SCR system, injecting, using a fluid injector, a urea solution into the mixing duct to mix the urea with the exhaust gas stream, monitoring, using a controller, at least one selected condition indicative of the deposition of urea within the SCR system, and applying vibrations to one or both of the fluid injector and the mixing duct of the SCR system to mitigate the deposition of urea when the at least one selected condition is met.

Further and alternative aspects and features of the disclosed principles will be appreciated from the following detailed description and the accompanying drawings. As will be appreciated, the principles related to end cutting-bits disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

This disclosure relates to exhaust after-treatment systems for machines and, more particularly, to exhaust after-treatment systems for diesel engines used on stationary or mobile machines. The machines contemplated in the present disclosure can be used in a variety of applications and environments. For example, any machine that performs some type of operation associated with an industry such as mining, construction, farming, transportation, marine or any other industry known in the art is contemplated. For example, the type of machine contemplated herein may be an earth-moving machine, such as a wheel loader, excavator, dump truck, backhoe, material handler, locomotive, paver or the like. Apart from mobile machines, the machine contemplated may be a stationary or portable machine such as a generator set, an engine driving a gas compressor or pump, and the like. Moreover, the machine may include or be associated with work implements such as those utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

This disclosure particularly relates to systems and methods that provide a reduction of deposits as a result of urea-solution injection within an exhaust after-treatment system and related components of a SCR system associated with an engine. The systems and methods disclosed herein are effective in reducing urea deposits and permit urea dosing at lower than conventional temperatures and at higher than conventional amounts.

Figure 1:
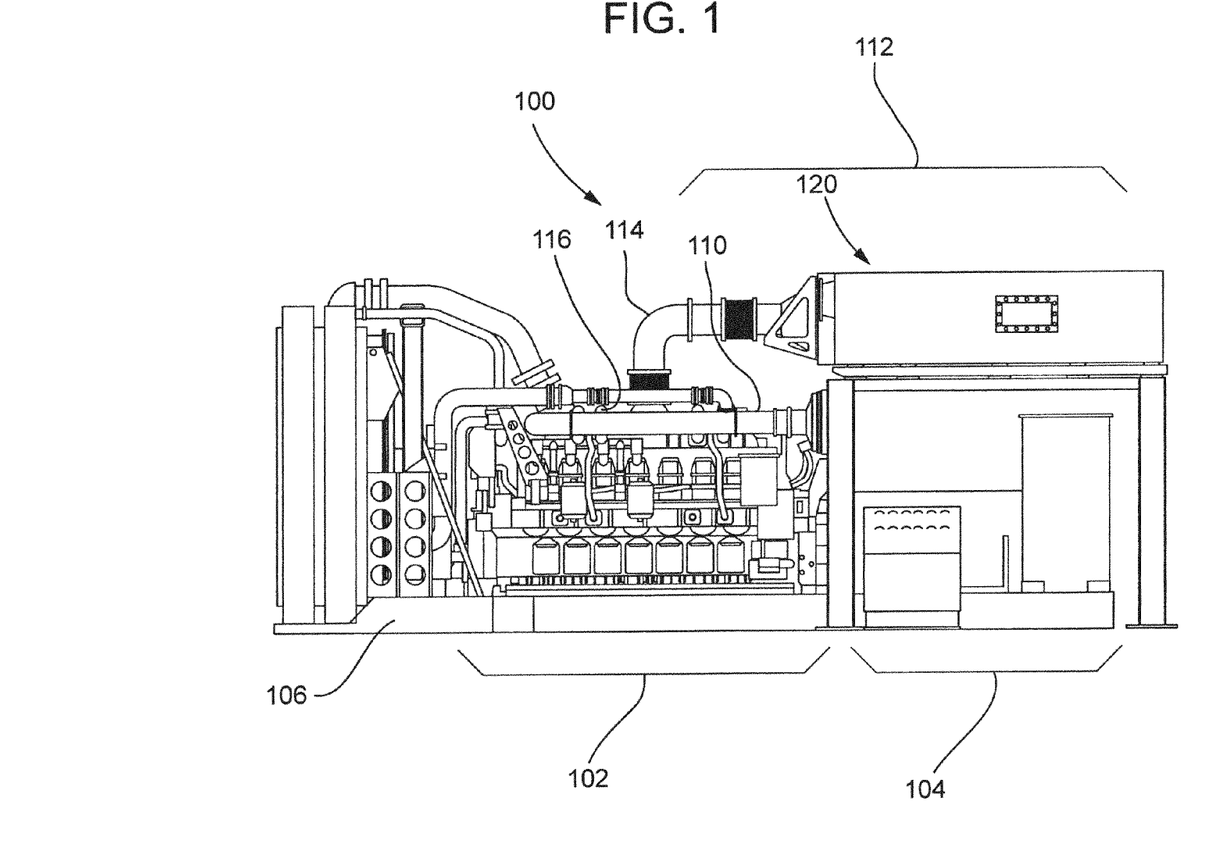
FIG. 1 is a side elevation view of a power system including an internal combustion engine coupled to a generator and associated with an exhaust after-treatment system.

Now referring to the drawings, there is illustrated in FIG. 1 an example of a power system 100 that can generate power by combusting fossil fuels or the like. The illustrated power system 100 can include an internal combustion engine 102 such as a diesel engine operatively coupled to a generator 104 for producing electricity. The internal combustion engine 102 may have any number of cylinders as may be appreciated by one of ordinary skill in the art. The internal combustion engine 102 and the generator 104 can be supported on a common mounting frame 106. The power system 100 can provide on-site stand-by power or continuous electrical power at locations where access to an electrical grid is limited or unavailable. Accordingly, the generator 104 and internal combustion engine 102 can be scaled or sized to provide suitable wattage and horsepower. It should be appreciated that in addition to stationary applications, the present disclosure can be utilized in mobile applications such as locomotives and marine engines.

To direct intake air into and exhaust gasses from the power system 100, the power system can include an air introduction system 110 and an exhaust system 112. The air introduction system 110 introduces air or an air/fuel mixture to the combustion chambers of the internal combustion engine 102 for combustion while the exhaust system 112 includes an exhaust pipe or exhaust channel 114 in fluid communication with the combustion chambers to direct the exhaust gasses produced by the combustion process to the environment. To pressurize intake air by utilizing the positive pressure of the expelled exhaust gasses, the power system 100 can include at least one turbocharger 116 operatively associated with the air introduction system 110 and the exhaust system 112.

The exhaust system 112 can include components to condition or treat the exhaust gasses before they are discharged to the environment. For example, an exhaust after-treatment system 120 in the form of a clean emissions module (CEM), for example, that can be disposed in fluid communication with the exhaust system 112 downstream of the at least one turbocharger 116 to receive the exhaust gasses discharged from the internal combustion engine 102. The term "after-treatment" refers to the fact that the system treats exhaust gasses after they have been produced and is therefore distinguishable from fuel additives and the like that affect the combustion process. The exhaust after-treatment system 120 can be designed as a separate unit that can be mounted to the power system 100 generally over the generator 104, for example, and can receive exhaust gasses from the exhaust channel 114. By manufacturing the exhaust after-treatment system 120 as a separate modular unit, the design can be utilized with different sizes and configurations of the power system 100. However, in other embodiments, the exhaust after-treatment system 120 can be integral with the power system 100 and can be disposed at other locations rather than above the power system. The exhaust after-treatment system 120 can be configured to treat, remove or convert regulated emissions and other constituents in the exhaust gasses.

Figure 2:
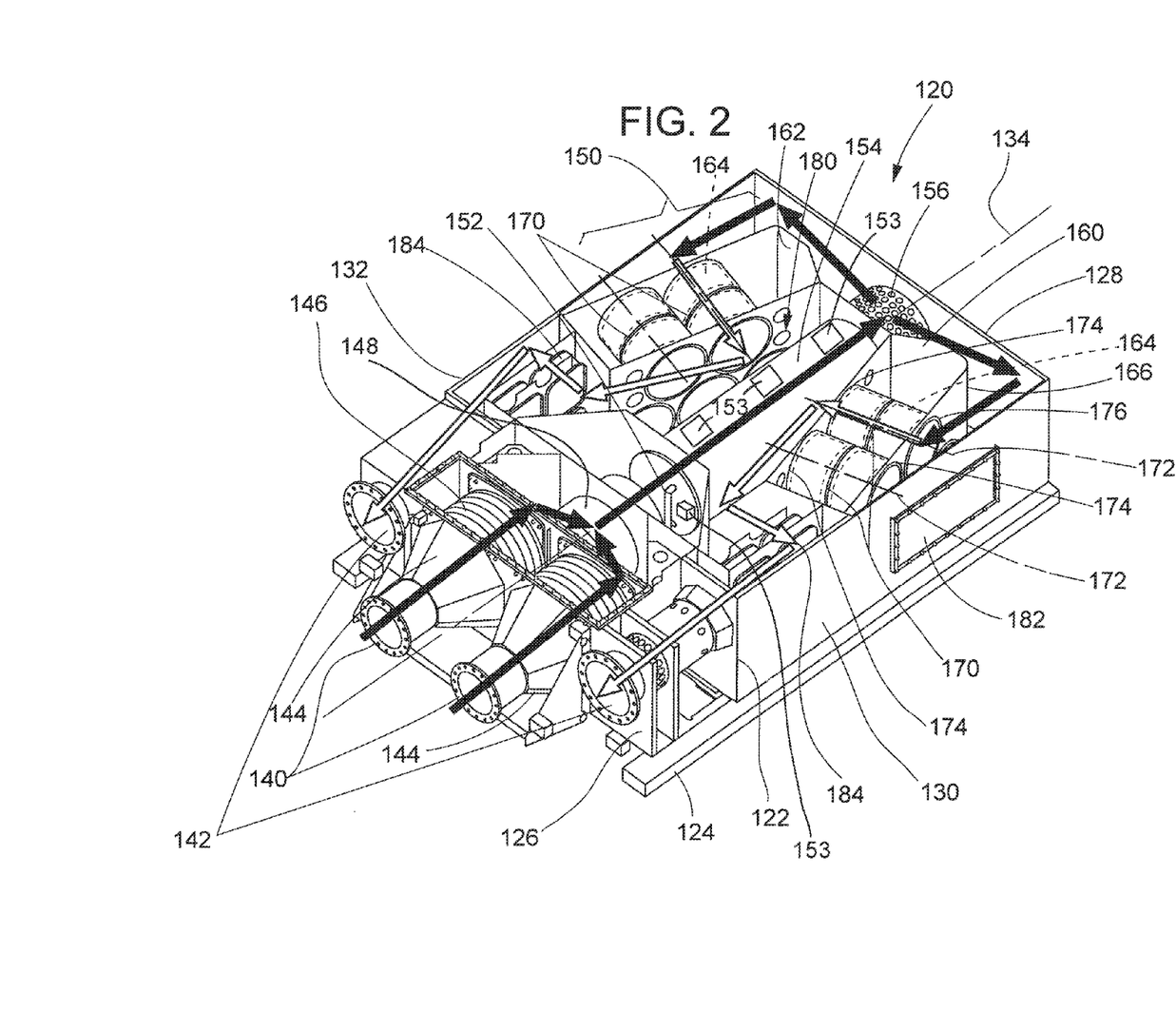
FIG. 2 is a perspective view of an exhaust after-treatment system with the top removed to illustrate the components inside of, and exhaust flow through, the system.

Referring to FIG. 2, the exhaust after-treatment system 120 can include a box-like housing 122 that is supported on a base support 124 adapted to mount the exhaust after-treatment system to the power system. The box-like housing 122 can include a forward-directed first wall 126, an opposing rearward second wall 128, and respective third and fourth sidewalls 130, 132. However, it should be appreciated that terms like forward, rearward and side are used only for orientation purposes and should not be construed as a limitation on the claims. Additionally, extending between the forward first wall 126 and rearward second wall 128 and located midway between the third and fourth sidewalls 130, 132 can be an imaginary central system axis line 134. The housing 122 may be made from welded steel plates or sheet material.

To receive the untreated exhaust gasses into the exhaust after-treatment system 120, at least one inlet 140 can be disposed through the first wall 126 of the housing 122 and can be coupled in fluid communication to the exhaust channel from the exhaust system. In the embodiment illustrated, the exhaust after-treatment system 120 includes two inlets 140 arranged generally in parallel and centrally located between the third and fourth sidewalls 130, 132 on either side of the system axis line 134 so that the entering exhaust gasses are directed toward the rearward second wall 128. However, other embodiments of the exhaust after-treatment system 120 may include different numbers and/or locations for the inlets. To enable the exhaust gasses to exit the exhaust after-treatment system 120, two outlets 142 can also be disposed through the first wall 126 of the housing 122. Each outlet 142 can be parallel to the centrally oriented inlets 140 and can be disposed toward one of the respective third and fourth sidewalls 130, 132.

To treat or condition the exhaust gasses, the housing 122 can contain various types or kinds of exhaust treatment devices through or past which the exhaust gasses are directed. For example and following the arrows indicating exhaust flow through the exhaust after-treatment system 120, in order to slow the velocity of the incoming exhaust gasses for treatment, the inlets 140 can each be communicatively associated with an expanding, cone-shaped first diffuser 144 mounted exteriorly of the first wall 126. Each first diffuser 144 can direct the exhaust gasses to an associated diesel oxidation catalyst (DOC) 146 located proximate the first wall 126 inside the housing 122 that then directs the exhaust gasses to a common collector duct 148 centrally aligned along the system axis line 134. The DOC 146 can contain materials such as platinum group metals like platinum or palladium which can catalyze carbon monoxide and hydrocarbons in the exhaust gasses to water and carbon dioxide via the following possible reactions:

$$CO + \tfrac{1}{2}O_2 = CO_2 \qquad (1)$$

$$[HC] + O_2 = CO_2 + H_2O \qquad (2)$$

To further reduce emissions in the exhaust gasses and, particularly, to reduce nitrogen oxides such as NO and $NO_2$, sometimes referred to as $NO_X$, the exhaust after-treatment system 120 may include an SCR system 150. In the SCR process, a liquid or gaseous reductant agent is introduced to the exhaust system and directed through an SCR catalyst along with the exhaust gasses. The SCR catalyst can include materials that cause the exhaust gasses to react with the reductant agent to convert the $NO_X$ to nitrogen ($N_2$) and water ($H_2O$). A common reductant agent is urea (($NH_2$)$_2$CO), though other suitable substances such as ammonia ($NH_3$) can be used in the SCR process. The reaction may occur according to the following general formula:

$$NH_3 + NO_X = N_2 + H_2O \qquad (3)$$

Referring to FIG. 2, to introduce the reductant agent, the SCR system 150 includes a reductant injector 152 located downstream of the collector duct 148 and upstream of a centrally aligned mixing duct 154 that channels the stream of exhaust gasses toward the rearward second wall 128 of the housing 122. The reductant injector 152 is in fluid communication with a storage tank or reservoir storing the reductant agent and can periodically, or continuously, inject a measure of the reductant agent into the exhaust gas stream in a process sometimes referred to as dosing. The amount of reductant agent introduced can be dependent upon the $NO_X$ load of the exhaust gasses. The mixing duct 154 uniformly intermixes the reductant agent with the exhaust gasses before they enter the downstream SCR catalysts. Disposed at the end of the mixing duct 154 proximate the second wall 128 can be a second diffuser 156 that redirects the exhaust gas/reductant agent mixture toward the third and fourth sidewalls 130, 132 of the exhaust after-treatment system 120. The third and fourth sidewalls 130, 132 can redirect the exhaust gas/reductant agent mixture generally back towards the front first wall 126. The mixing duct 154 can take any number of external and internal forms, an example of which is disclosed in more detail in FIG. 3 and FIG. 4.

The exhaust after-treatment system 120 is provided with at least one vibration mechanism 153, which in operation, functions to mitigate the deposition of urea within the system. The vibration mechanism 153 may be any suitable apparatus, mechanism or element capable of generating sufficient vibrations at an amplitude and frequency to mitigate the deposition of urea. The vibrations thus generated have the effect of breaking up, loosening and/or dislodging deposits.

An example of a suitable and well-known vibration mechanism 153 is an eccentric vibration mechanism driven by an electric motor or a mechanically rotated mechanism with an eccentric part or weight. An eccentric is a circular disk or the like or an eccentric sheave solidly fixed to a rotating axle, driven by the motor or mechanism, with its centre offset from that of the axle. The rotation of the offset disk imparts vibrations to structures to which it is connected by its unbalanced nature.

Another example of a suitable and well-known vibration mechanism 153 is a piezoelectric actuator or motor. The piezoelectric actuator can be linear or rotary. Other vibration mechanisms are contemplated that can be operated in conjunction with an SCR system or the equivalent.

The vibration mechanism 153 can be operated to impart vibrations at a frequency of about 6,000 revolutions/cycles per minute (RPM/CPM) to 1,000,000 RPMs or more. When operated in an ultrasonic frequency range, it may operate at frequencies over 20,000 hertz (Hz) i.e., 1,200,000 CPM. Some vibrating mechanisms operate at a frequency of 1.6 megahertz (MHz) or 1,600,000 CPM.

The vibration mechanism 153 can be operated at a constant frequency or according to a selected pattern of frequencies or according to a randomized pattern of frequencies. The vibration mechanism 153 can be operated to impart vibrations continuously or according to selected time intervals. Further methods of operation and some examples of operating criteria are detailed hereinbelow.

In one embodiment, a vibration mechanism 153 is directly or operatively connected to the reductant injector 152. The vibration mechanism 153 can be connected to the reductant injector 152 on or near the body (See FIG. 7, for example) or on or near the injector nozzle (not shown) in direct abutting contact therewith or configured to impart vibrations from an adjacent or a remote position.

In another embodiment, at least one vibration mechanism 153 is connected to the mixing duct 154 in addition to or as an alternative to connecting a vibration mechanism to the injector. For example, a vibration mechanism 153 can be connected to the mixing duct 154 at or near an upstream end (inlet end 202 of FIG. 3) or a position at or near a downstream end (outlet end 204 of FIG. 3). Vibration mechanisms can be provided to internal parts of the mixing duct as will be shown in FIG. 3.

To perform the SCR reaction process, the exhaust after-treatment system 120 can include a first SCR module 160 disposed proximate the third sidewall 130 and a second SCR module 162 disposed toward the fourth sidewall 132. The first and second SCR modules 160, 162 are oriented to receive the redirected exhaust gas/reductant agent mixture. The first and second SCR modules 160, 162 can include a support structure or frame 166 that can accommodate at least one SCR catalyst (not shown), sometimes referred to as after-treatment bricks. The term after-treatment brick, however, may refer to a variety of exhaust after-treatment devices of which SCR catalysts are a subset.

To hold the plurality of SCR catalysts 164, the SCR modules 160, 162 can include at least one sleeve 170 that can slidably receive the catalysts. The sleeves 170 can be generally elongated, hollow tubular structures having a first end 174 and an opposing second end 176 aligned along a longitudinal sleeve axis 172. In some embodiments, the first end 174 can be designated a downstream end and the second end 176 can be designated an upstream end thereby establishing the direction of gas flow through the sleeve 170. In other embodiments, the system may be at least partially reversible so that either of the first and second ends may act as an upstream or downstream end. In those embodiments that include more than one sleeve 170 in the first and second SCR modules 160, 162, the sleeves can be supported in the truss-like frame 166 made, for example, from formed sheet metal or cast materials. The frame 166 can be oriented so that the first ends 174 communicate with a central region 180 of the exhaust after-treatment system 120 and the second ends 176 are directed toward the respective third and fourth sidewalls 130, 132. The second ends 176 may protrude or extend from the frame 166 so that a portion of the exterior of the sleeve 170 is exposed. To access the first and second SCR modules 160, 162, for example to retrieve and replace the plurality of SCR catalysts 164, at least one access panels 182 can be disposed in the respective third and fourth sidewalls 130, 132 positioned toward the modules. The central region 180 can direct the received exhaust gasses forward to the outlets 142 disposed through the front first wall 126. In various embodiments, at least one additional exhaust treatment device can be disposed in the exhaust after-treatment system 120 such as diesel particulate filters 184 for removing soot.

Figure 3:
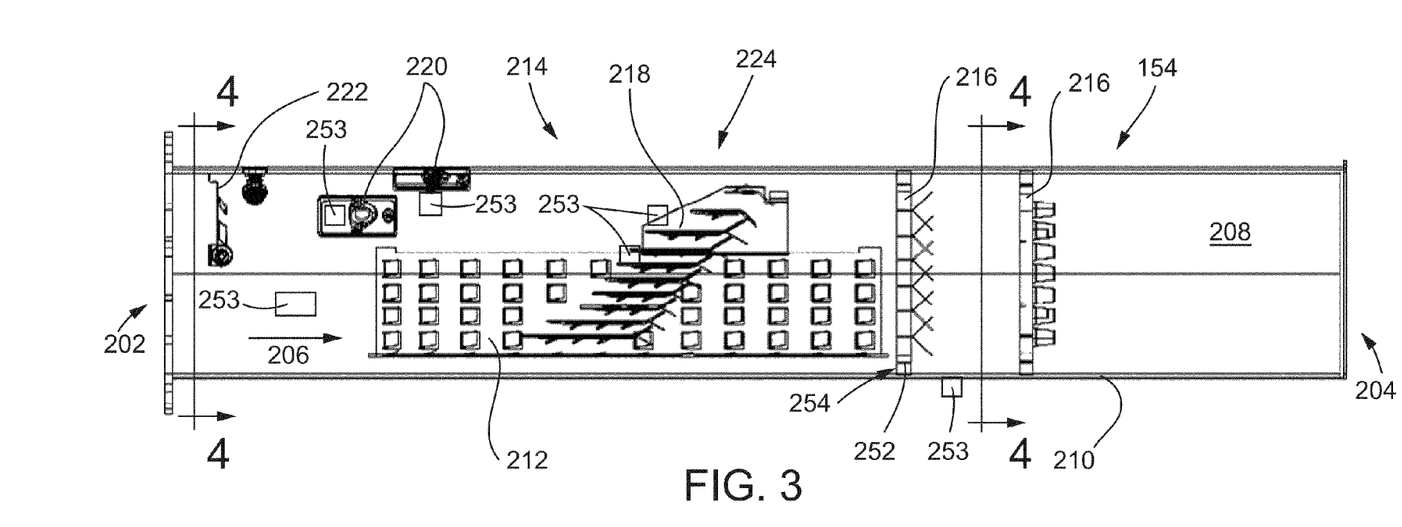
FIGS. 3 and 4 are fragmented views of a mixing tube from different perspectives in accordance with the disclosure.
Figure 4:
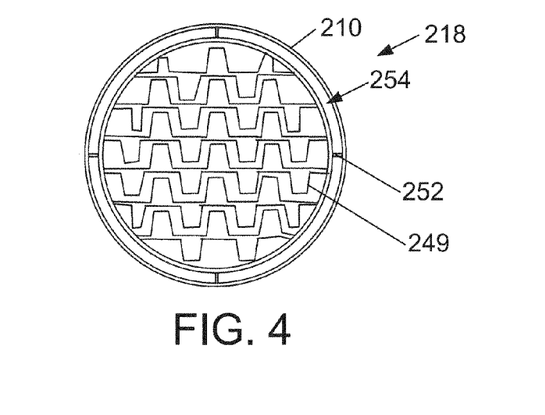

A cross section through an embodiment of the mixing duct 154 is shown in FIGS. 3 and 4. The mixing duct 154, which is embodied as a straight pipe section in the illustration, includes an inlet opening 202 and an outlet opening 204 that define a flow direction 206 through an inner cavity 208 of the pipe. The inner cavity 208, which is surrounded by a cylindrical pipe wall 210, encloses the mixer 224, which in the illustrated embodiment comprises various structures including a tray evaporator 212, a stepped evaporator 214, and two finned mixers 216. The stepped evaporator 214 includes a plurality of plates 218 arranged in a stepped configuration along a flow cross section of the mixing duct 154. The mixers 224 and 216 cooperate in evaporating liquid DEF provided in the mixing duct 154 and in mixing the evaporated DEF with the surrounding air to form a generally homogeneous mixture that is provided to downstream components. Each finned mixer 216 includes an inner structure 249 having a generally circular shape and forming a series of fins, which contact the flow through the mixing duct 154. Tabs 252 mount the inner structure 249 concentrically within the wall 210 such that a gap 254 is formed peripherally around the inner structure along the wall 210. During operation, an additional bypass flow passes around each finned mixer 216 through the gap to keep liquid, or un-evaporated, spray droplets off the mixing wall to further discourage formation of deposits on the mixers. It should be appreciated that fewer, more, the same or different mixing and/or evaporation elements may be used in the mixing duct 154. In the illustrated embodiment, the DEF is provided to the inner cavity 208 of the mixing duct 154 through three DEF injectors (not shown), each of which is connected to the cylindrical pipe wall 210 at a corresponding, injector mounting boss 220 (two mounting locations shown).

A flow agitator 222 is disposed within the inner cavity 208 at a location upstream of the injector mounting boss 220 and the mixer 224. The flow agitator 222 is connected to the cylindrical pipe wall 210 by mounting tabs, for example, by use of welds, an adhesive, or other fastening methods and/or structures.

A vibration mechanism 253, in function the same as shown in FIG. 2, can be connected at or near the inlet opening 202 in the vicinity of the flow agitator 222 and/or the outlet opening 204 in the vicinity of the finned mixers 216 of the mixer 224. In the alternative, or in addition to the above, a vibration mechanism 253 can be attached so as to be operatively associated with the injector mounting boss 220 to mitigate urea deposition at or near the injector. Also, vibration mechanisms 253 can be operatively associated with mixer 224. To mitigate deposition of urea on the mixer 224, vibration mechanisms 253 may be attached to the plates 218 of the stepped evaporator 214.

Figure 5:
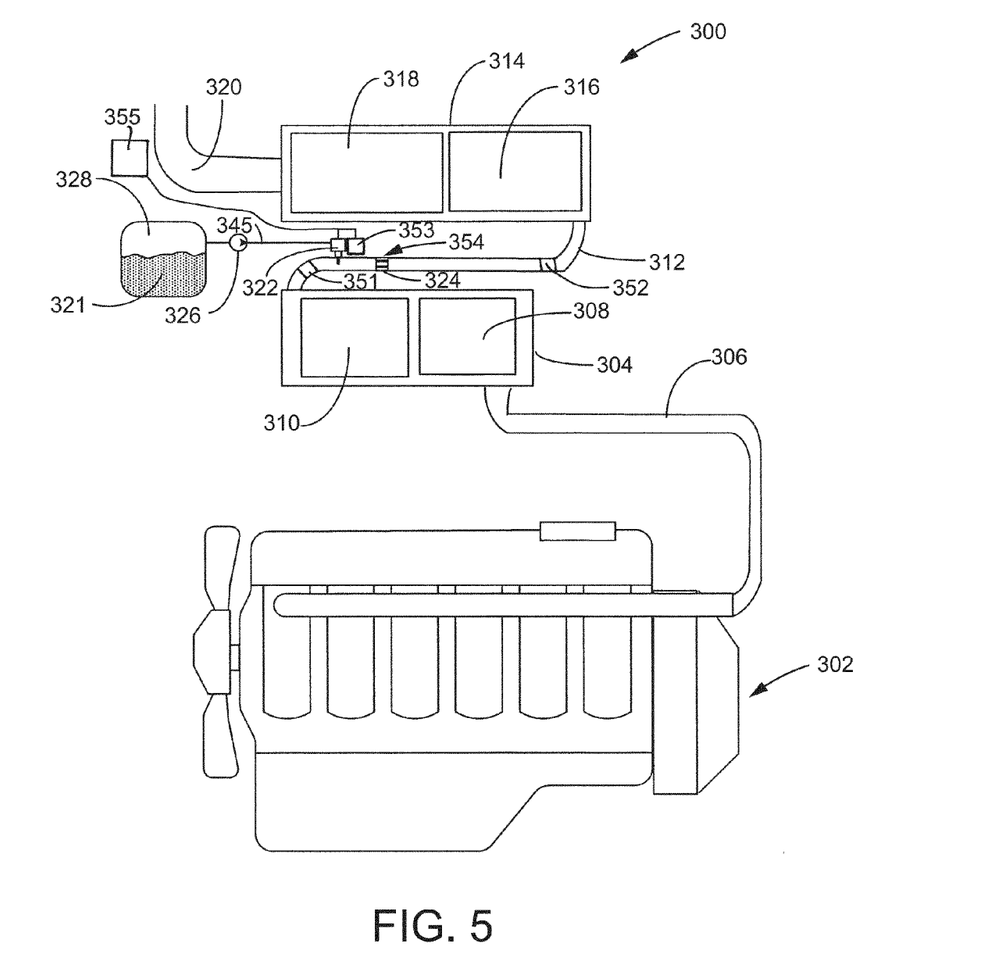
FIG. 5 is a block diagram of an engine having an exhaust after-treatment system in accordance with the disclosure.

FIG. 5 is a block diagram of an exhaust after-treatment system 300 associated with an engine 302. The system 300 may be modularly packaged as shown in the illustrated embodiment for retrofit onto existing engines or, alternatively, for installation on new engines. In the illustrated embodiment, the exhaust after-treatment system 300 includes a first module 304 that is fluidly connected to an exhaust conduit 306 of the engine 302. During engine operation, the first module 304 is arranged to internally receive engine exhaust gas from the conduit 306. The first module 304 may contain various exhaust gas treatment devices such as a diesel oxidation catalyst (DOC) 308 and a diesel particulate filter (DPF) 310, but other devices may be used. Exhaust gas provided to the first module 304 by the engine 302 may first pass through the DOC 308 and then through the DPF 310 before entering a mixing duct 354 comprising a mixer 324, as shown in FIG. 3.

The mixing duct 354 fluidly interconnects the first module 304 with a second module 314 such that exhaust gas from the engine 302 may pass through the first and second modules 304 and 314 in series before being released at a stack 320 that is connected to the second module. In the illustrated embodiment, the second module 314 encloses a SCR catalyst 316 and an Ammonia Oxidation Catalyst (AMOX) 318. The SCR catalyst 316 and AMOX 318 operate to treat exhaust gas from the engine 302 in the presence of ammonia, which is provided after degradation of a urea-containing solution injected into the exhaust gas in the mixing duct 354.

More specifically, a urea-containing water solution, which is commonly referred to as diesel exhaust fluid (DEF) 321, is injected into the mixing duct 354 by a DEF injector 322. The DEF 321 is contained within a fluid reservoir 328 and is provided to the DEF injector 322 by a pump 326. As the DEF 321 is injected into the mixing duct 354, it mixes in the mixer 324 with exhaust gas passing therethrough and is thus carried to the second module 314. To promote mixing of DEF with exhaust, the mixer 324 may be disposed along the mixing duct 354 provided with vibration mechanisms 353 on or near DEF injector 322 and at positions shown in FIG. 3.

The exhaust after-treatment system 300 can include a controller 355, the operations of which may be conducted by an engine control module (ECM) or a discreet electronic module. The controller 355 can be operatively connected to at least one of the pump 326, the DEF injector 322, the vibration mechanism 353, and at least one sensor for monitoring aspects of the mixing duct 354. The controller 355 can generate and transmit signals to control the operation of the pump 326, the DEF injector 322 and the vibration mechanism 353 according to selected programs and/or in response to changes in at least one condition of the exhaust after-treatment system 300 and associated systems. Those conditions include engine speed, engine load, engine and/or exhaust after-treatment system operating temperatures, elapsed time of engine operation and changes in pressure in the mixer 324, for example.

The at least one sensor can include a first sensor 351 disposed upstream of mixer 324 and a second sensor 352 disposed downstream of the mixer. The first and second sensors 351, 352 may be temperature sensors. The temperature sensors may be use by the controller 355 to determine optimal periods to actuate the vibration mechanism 353. For example, during start up conditions, where the operating temperature of the exhaust gas and mixing duct 354 is low, it may be desirable to actuate the vibration mechanism 353.

The first and second sensors 351, 352 may each be a pitot tube in communication with the controller 355. A pitot tube is a pressure measurement instrument used to measure fluid flow velocity. In one example, the controller 355 may be configured to monitor changes in fluid flow in the mixing duct 354 using signals from the pitot tubes. As urea accumulates, the increase in deposition would be expected to create a change in fluid flow (exhaust gas flow) through the mixing duct 354. A sensed change in fluid flow would initiate a process in the controller 355 whereby the vibration mechanism 353 would be actuated according to a selected set of parameters, e.g., time period(s) and frequency (or frequencies) or some randomized set of parameters to mitigate the deposition of urea.

Figure 6:
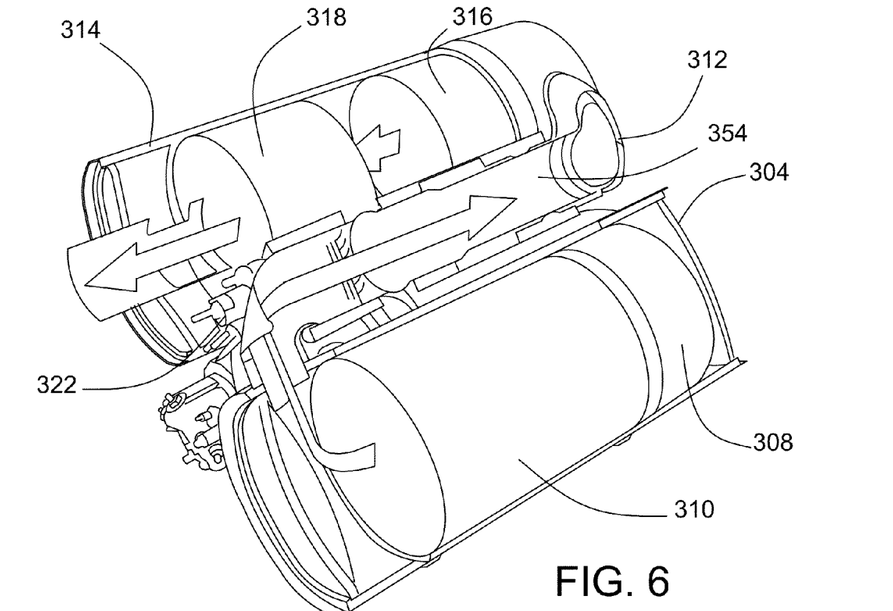
FIG. 6 is a partially sectioned outline view of an exhaust after-treatment system in accordance with the disclosure.
Figure 7:
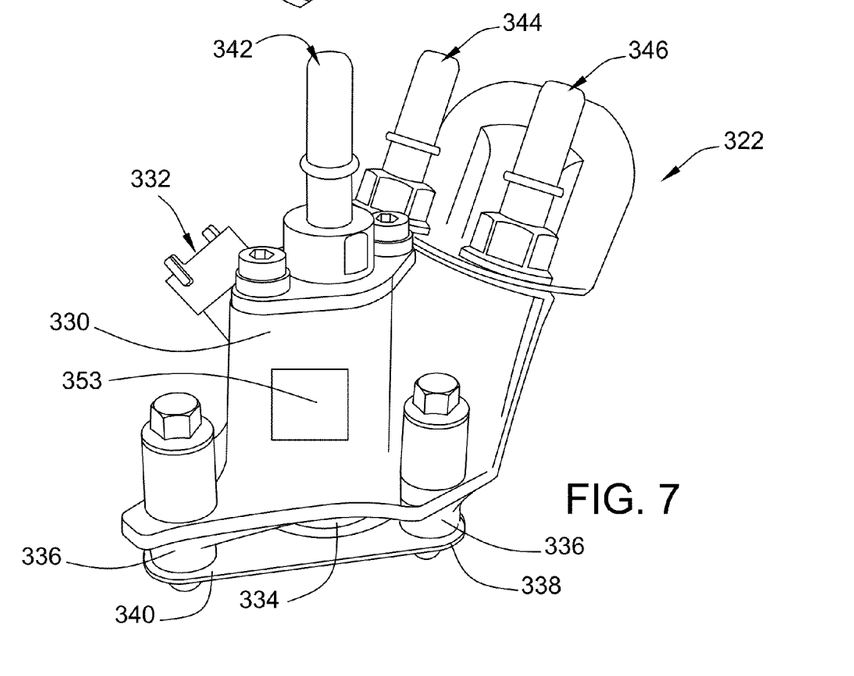
FIG. 7 is an outline view of an injector for diesel exhaust fluid (DEF) in accordance with the disclosure.

FIG. 6 is a partially sectioned outline view of the exhaust after-treatment system 300 of FIG. 5 with the internal elements of the mixing duct 354 not shown (see FIG. 3 for details of a mixing duct) and FIG. 7 is an outline view of the DEF injector 322 for illustration. In reference to these figures, the present disclosure is aimed at addressing the deposition of urea on or near with the DEF injector 322, the mixer 324 and surrounding elements.

In reference to FIG. 6, the first and second modules 304 and 314 are disposed next to one another, with the mixing duct 354 disposed between them. The DEF injector 322 is disposed on an upstream end of the mixing duct 354 relative to a direction of exhaust gas flow.

An outline view of a DEF injector 322 embodiment is shown in FIG. 7. In this embodiment, the injector 322 includes a body portion 330 that houses an internal electrical actuator (not shown), which can receive command signals through an electrical connector 332 connected to the body portion 330. The command signals can be generated by the controller 355 (FIG. 5).

The actuator is connected to a valve member 334. The valve member 334, when open, permits a flow of DEF out of the injector 322 and into the mixing duct 354. To create a conductive heat transfer barrier between the body portion 330 and the exhaust system to which the injector 322 is connected to, a plurality of spacers 336 can be used to space apart the body portion 330 from a mounting flange 338, thus creating a gap 340 between the body portion 330 of the injector 322 and the mounting flange 338.

DEF is supplied to the valve member 334 through the body portion 330. A DEF inlet conduit 342 is connected to a conduit 345, which is in turn fluidly connected to the fluid reservoir 328. Under certain operating conditions, the flow of DEF through the injector 322 between the inlet conduit 342 and the valve member 334 acts to convectively cool the body portion 330 during operation. A vibration mechanism 353 can be attached to the body portion 330 or the injector nozzle (not shown) for generating vibrations and conducting the vibrations thereto.

Figure 8:
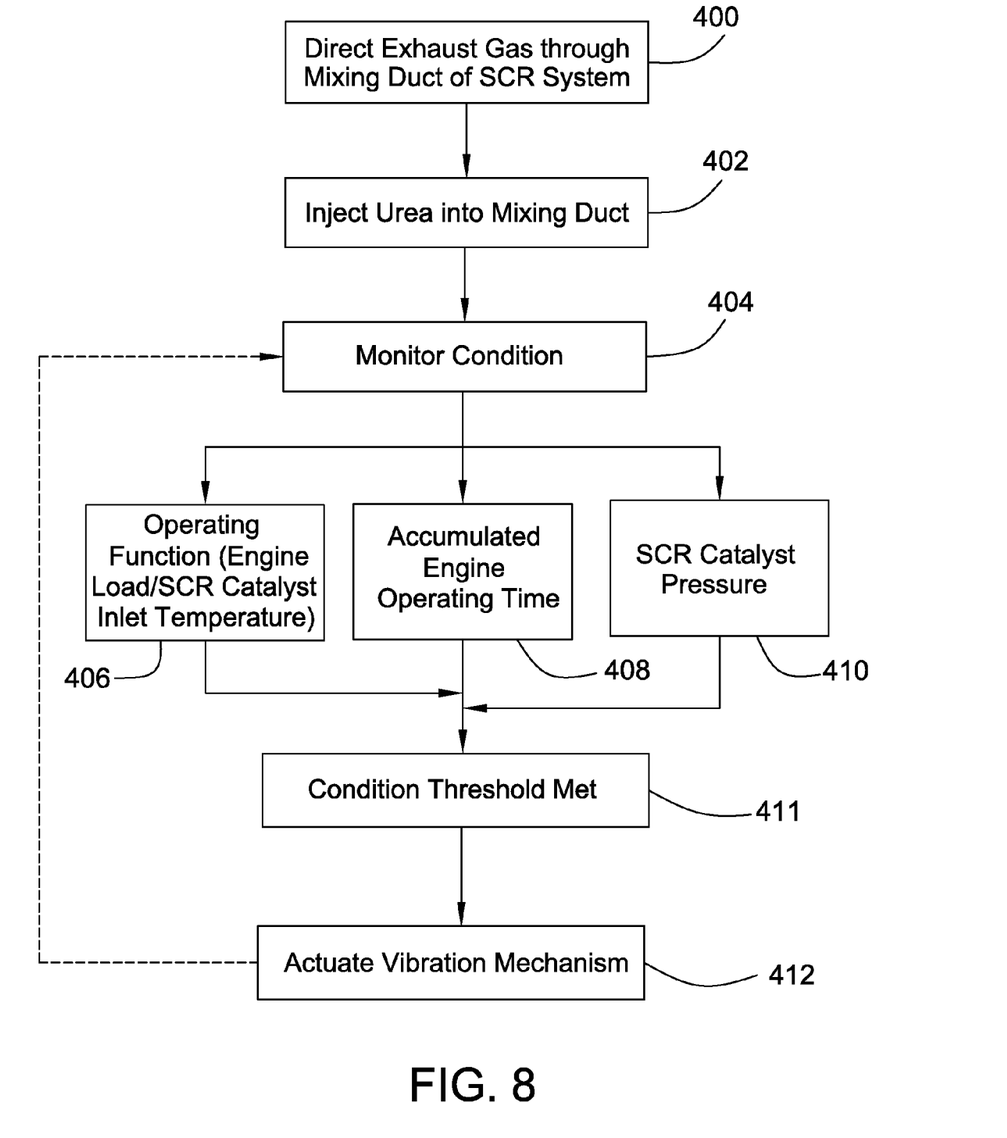
FIG. 8 is a flow chart illustrating methods of mitigating deposition of urea in an exhaust after-treatment system.

FIG. 8 is a flow chart illustrating methods of mitigating deposition of urea in an exhaust after-treatment system according to the above disclosure. Referring also to the above, the method includes at step 400 directing exhaust gas through a mixing duct 354 of the SCR portion of an exhaust after-treatment system 300. It will be understood that the exhaust gas will derive from an engine in communication with the exhaust after-treatment system.

Urea is injected at step 402 into the mixing duct 354. The urea may be injected continuously or according to a selected dosing program as is known in the art. It will also be understood that the mitigation systems and methods disclosed herein can mitigate deposition of urea to a great extent and thus permit greater than typical dosing.

At least one condition is monitored with appropriate sensors (such as sensor 351) at step 404, for example by a controller 355, of the exhaust after-treatment system 300 and optionally also associated systems, including an engine 302. The conditions, set out in 406, 408 and 410 include at least one system operating function, for example, engine speed, engine load, SCR catalyst inlet temperature, engine operating time and SCR catalyst fluid pressure, for example.

When a condition threshold is met or exceeded or the condition meets at least one selected criteria at step 411, the controller 355 actuates at least one vibration mechanism 353 at step 412.

The method contemplates that the controller 355 can continue to monitor conditions to determine when and how vibration mechanisms are to be actuated. In one embodiment, the monitoring is according to a closed loop, wherein, for example, the fluid pressure is monitored for changes, wherein the changes are considered beneficial or deleterious.

An open loop method is also contemplated wherein the controller 355 controls the vibration mechanism 353 according to a selected set of conditions, such as elapsed operating time, wherein no feedback is necessary.

Figure 9:
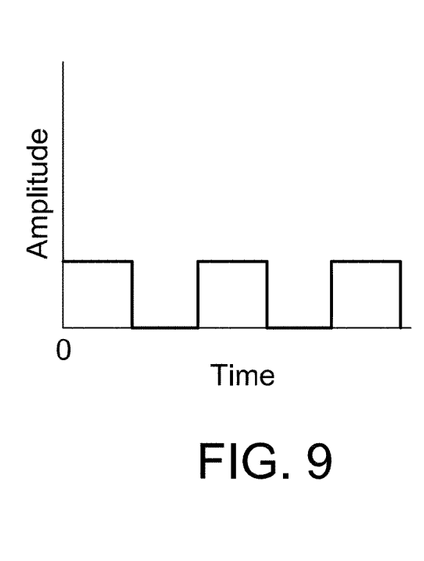
FIG. 9 illustrates a method of operating a vibration mechanism in conjunction with an exhaust after-treatment system according to selected, regular intervals.
Figure 10:
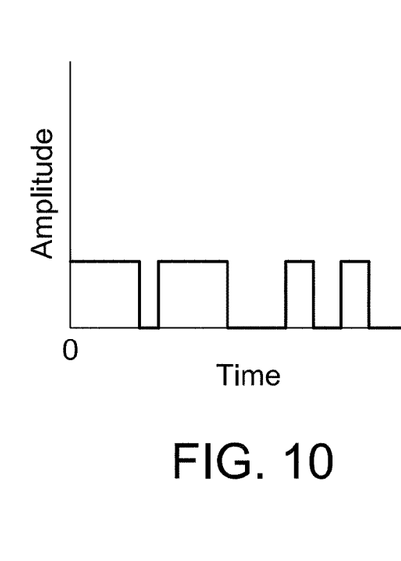
FIG. 10 illustrates a method of operating a vibration mechanism in conjunction with an exhaust after-treatment system according to irregular or random intervals.
Figure 11:
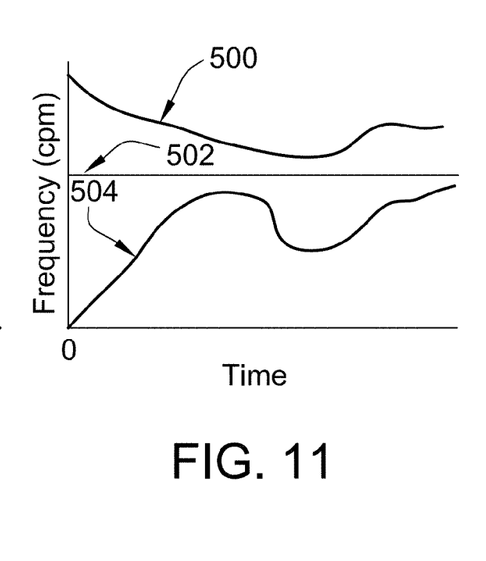
FIG. 11 illustrates a method of operating a vibration mechanism in conjunction with an exhaust after-treatment system according to different frequency curves.

FIGS. 9-11 illustrate a range of operation methods of the exhaust after-treatment system of the disclosure. FIG. 9 shows operation of the vibration mechanism 353 according to regular, evenly spaced intervals. In other words, the vibration mechanism 353 can be operated for a period of time, for example, at start up of the engine, and then non-operated for an equal period of time. At the end of the non-operated interval, the vibration mechanism 353 is again actuated, and the pattern of on/off/on is repeated as long as the engine is operational. FIG. 10 shows an alternative operation method where the vibration mechanism 353 can be operated for a period of time, for example, at start up of the engine, and then non-operated for an equal period of time. Afterwards, the intervals of operation and non-operation can be shortened or spaced more closely together in time. Alternatively, the exhaust after-treatment system can be operated in a converse fashion where the intervals of operation and non-operation can be lengthened or spaced more apart in time.

FIG. 11 shows that the vibration mechanism 353 can be operated at a single unchanging frequency 502 or according to a generally rising frequency curve 504. The generally rising frequency curve 504 can start at a relatively low frequency and rise over time to a selected first frequency and optionally dropped down again to second frequency. The generally rising frequency 504 can trend upwards after operating at the second frequency to a peak frequency. Further, the vibration mechanism 353 can be operated according to a generally dropping frequency curve 506. It may be desirable to fashion the operating frequency of the vibration mechanism 353 at or near a naturally resonant frequency of urea in a crystalline state as this may prove to be most efficacious.

INDUSTRIAL APPLICABILITY

The industrial application of an exhaust after-treatment system according to the preceding description and following claims should be readily apparent from the foregoing discussion. The present system can be applicable to any machine employing an engine that emits exhaust with a chemical component that can be reduced by exposure to urea. Such a machine can be dosed at a higher rate due to the mitigation of urea deposits in the exhaust after-treatment system resulting in lower emissions. The cost of maintenance of such systems would be reduced, downtime would be reduced, and the overall efficiency of the machine would be enhanced. The present disclosure, therefore, can be applicable to many different emissions modules and environments.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An exhaust after-treatment system for mitigating deposition of urea utilizing selective catalytic reduction (SCR) in exhaust receiving communication with an exhaust gas stream produced by an engine system, comprising:
    an exhaust passage including a mixing duct through which the exhaust gas stream flows;
    a fluid reservoir containing a urea solution;
    a fluid pump fluidly connected to the fluid reservoir to draw the urea solution from within the fluid reservoir;
    a fluid injector configured to receive the urea solution from the fluid pump and deliver the urea solution into the mixing duct; and
    at least one vibration mechanism mechanically coupled to one or both of the fluid injector and the mixing duct to generate and convey vibrations thereto to mitigate the deposition of urea,
    wherein the mixing duct includes a mixer and the at least one vibration mechanism is operatively connected to the mixer.

2. The exhaust after-treatment system of claim 1, wherein the at least one vibration mechanism includes one or both of an eccentric vibration mechanism and a piezoelectric actuator.

3. The exhaust after-treatment system of claim 1, wherein the mixer includes a plurality of plates and the at least one vibration mechanism is operatively connected to at least one of the plurality of plates.

4. The exhaust after-treatment system of claim 1, further comprising a second vibration mechanism operatively connected to the fluid injector.

5. The exhaust after-treatment system of claim 1, further comprising a controller operatively connected to the at least one vibration mechanism to operate the at least one vibration mechanism according to at least one condition.

6. The exhaust after-treatment system of claim 5, wherein the controller is further configured to monitor the at least one condition and cause actuation of the at least one vibration mechanism when the at least one condition is met.

7. The exhaust after-treatment system of claim 5, wherein the at least one condition is at least one of an engine operating time, an SCR catalyst inlet temperature, and a SCR fluid pressure within the mixing duct.

8. A method of mitigating deposition of urea within an exhaust after-treatment system utilizing selective catalytic reduction (SCR) in exhaust receiving communication with an exhaust gas stream produced by an engine system, comprising the steps of:
    directing the exhaust gas stream through a mixing duct of a SCR system;
    injecting, using a fluid injector, a urea solution into the mixing duct to mix the urea with the exhaust gas stream;
    monitoring, using a controller, at least one selected condition indicative of the deposition of urea within the SCR system, wherein the at least one selected condition is at least one of an engine operating time, an SCR catalyst inlet temperature and a SCR fluid pressure; and
    applying vibrations to one or both of the fluid injector and the mixing duct of the SCR system to mitigate the deposition of urea when the at least one selected condition is met.

9. The method of claim 8, wherein said applying vibrations step includes applying vibrations of greater than about 6,000 Hertz (Hz).

10. The method of claim 9, wherein said applying vibrations step includes applying vibrations in an ultrasonic range.

11. The method of claim 9, wherein said applying vibrations step includes applying vibrations at a selected frequency.

12. The method of claim 8, wherein said applying vibrations step is performed by one or both of an eccentric vibration mechanism and a piezoelectric actuator.

13. The method of claim 8, wherein the vibrations are applied continuously.

14. The method of claim 8, wherein the vibrations are applied at regular intervals.

15. The method of claim 8, wherein the vibrations are applied at random intervals.

16. The method of claim 8, wherein the vibrations are applied at engine startup.

17. The method of claim 8, wherein the controller is in communication with at least one pitot tube to monitor fluid pressure within the exhaust after-treatment system and wherein said applying vibrations step is initiated when fluid pressure reaches a selected pressure.

* * * * *